(12) United States Patent
Yuno et al.

(10) Patent No.: US 10,634,207 B2
(45) Date of Patent: Apr. 28, 2020

(54) DAMPING FORCE CONTROL TYPE SHOCK ABSORBER

(71) Applicant: HITACHI AUTOMOTIVE SYSTEMS, LTD., Ibaraki (JP)

(72) Inventors: Osamu Yuno, Yokohama (JP); Yasuhiro Aoki, Yokohama (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 202 days.

(21) Appl. No.: 15/779,373

(22) PCT Filed: Nov. 16, 2016

(86) PCT No.: PCT/JP2016/083910
§ 371 (c)(1),
(2) Date: May 25, 2018

(87) PCT Pub. No.: WO2017/090492
PCT Pub. Date: Jun. 1, 2017

(65) Prior Publication Data
US 2018/0355941 A1    Dec. 13, 2018

(30) Foreign Application Priority Data
Nov. 26, 2015  (JP) .................................. 2015-230748

(51) Int. Cl.
*F16F 9/34* (2006.01)
*F16F 9/32* (2006.01)
(Continued)

(52) U.S. Cl.
CPC .......... *F16F 9/3214* (2013.01); *F16F 9/3487* (2013.01); *F16F 9/461* (2013.01);
(Continued)

(58) Field of Classification Search
CPC .... F16F 9/34; F16F 9/3485; F16F 9/46; F16F 9/465
(Continued)

(56) References Cited

U.S. PATENT DOCUMENTS 6,371,262 B1 * 4/2002 Katou ..................... F16F 9/465
188/266.5
7,694,785 B2 * 4/2010 Nakadate .............. F16F 9/3484
188/266.5
(Continued)

FOREIGN PATENT DOCUMENTS

JP          3978707      9/2007
JP       2008-249107   10/2008
(Continued)

OTHER PUBLICATIONS

International Search Report dated Jan. 17, 2017 in International (PCT) Application No. PCT/JP2016/083910.

*Primary Examiner* — Christopher P Schwartz
(74) *Attorney, Agent, or Firm* — Wenderoth, Lind & Ponack, L.L.P.

(57) ABSTRACT

A damping force control type shock absorber capable of achieving both air bleeding performance and damping force responsiveness at reduced cost. When a pilot valve (47) is closed during the extension stroke of a piston rod (6), a cylinder upper chamber (2A) is communicated with a back-pressure chamber (46) through a passage (73) including an orifice (76), a communicating passage (70), a pilot chamber (33), and a communicating passage (50). At this time, the cylinder upper chamber (2A) is not communicated with a cylinder lower chamber (2B); therefore, damping force responsiveness is ensured. Further, because there is no need to provide a check valve in the passage, it is possible to suppress an increase in manufacturing cost. Further, air entering the pilot chamber (33) moves upward through the (Continued)

communicating passage (70). Therefore, the air can be discharged into the cylinder upper chamber (2A) through the passage (73).

4 Claims, 3 Drawing Sheets

(51) Int. Cl.
    *F16F 9/348*     (2006.01)
    *F16F 9/46*     (2006.01)
    *F16F 9/512*     (2006.01)
    *F16F 9/36*     (2006.01)

(52) U.S. Cl.
    CPC ............ *F16F 9/464* (2013.01); *F16F 9/5126* (2013.01); *F16F 9/368* (2013.01)

(58) Field of Classification Search
    USPC ............ 188/266.1–266.6, 313, 282.1–282.8, 188/322.13, 322.15, 318
    See application file for complete search history.

(56) References Cited

U.S. PATENT DOCUMENTS

| | | | |
|---|---|---|---|
| 7,997,394 B2* | 8/2011 | Yamaguchi | F16F 9/465 188/266.2 |
| 2003/0098209 A1* | 5/2003 | Nakadate | F16F 9/3485 188/282.5 |
| 2008/0236966 A1 | 10/2008 | Yamaguchi | |
| 2009/0272611 A1* | 11/2009 | Hayama | F16F 9/3485 188/282.1 |
| 2012/0305348 A1* | 12/2012 | Katayama | B60G 17/08 188/266.2 |
| 2014/0291088 A1* | 10/2014 | Katayama | F16F 9/341 188/313 |
| 2015/0275999 A1* | 10/2015 | Mori | F16F 9/18 188/313 |

FOREIGN PATENT DOCUMENTS

| | | |
|---|---|---|
| JP | 2014-199076 | 10/2014 |
| JP | 2015-194198 | 11/2015 |

* cited by examiner

DAMPING FORCE CONTROL TYPE SHOCK ABSORBER

TECHNICAL FIELD

The present invention relates to a damping force control type shock absorber generating damping force by controlling a flow of hydraulic fluid induced by movement of a piston rod.

BACKGROUND ART

Among semi-active suspension systems installed in vehicles, for example, there is known a semi-active suspension system that employs a damping force control type hydraulic shock absorber having a damping valve mechanism incorporated in a piston (for example, see Patent Literature 1). Conventionally, such a damping force control type shock absorber is arranged such that a cylinder upper chamber and a cylinder lower chamber are always in communication with each other through a passage for expelling unwanted air from a hydraulic circuit. Therefore, the conventional damping force control type shock absorber has drawbacks such as delay in rising of damping force, and limitation on the damping force adjustable range.

Under the above-described circumstances, it may be conceivable to reduce the sectional area (flow path area) of the passage for expelling air to thereby minimize the delay in rising of damping force and the reduction in damping force adjustable range. With this scheme, however, the manufacturing cost increases because tolerances become tighter. To solve this, it may be conceivable to provide a check valve in the above-described passage to thereby block the flow of hydraulic fluid from the cylinder upper chamber toward the cylinder lower chamber, as shown, for example, in Patent Literature 1. This, however, results in a complicated structure and leads to an increase in the number of assembling man-hours and an increase in manufacturing cost.

CITATION LIST

Patent Literature

PTL 1: Japanese Patent Application Laid-Open Publication No. 2008-249107

SUMMARY OF INVENTION

Technical Problem

An object of the present invention is to provide a damping force control type shock absorber capable of achieving both air bleeding performance and damping force responsiveness at reduced cost.

Solution to Problem

A damping force control type shock absorber according to one embodiment of the present invention includes a cylinder having a hydraulic fluid sealed therein, a piston slidably fitted in the cylinder to divide the interior of the cylinder into two chambers, a piston rod connected at one end thereof to the piston and extended at the other end thereof to the outside of the cylinder, and a damping valve mechanism provided in the cylinder to generate damping force by controlling a flow of hydraulic fluid between the two chambers in the cylinder that is caused by movement of the piston rod. The damping valve mechanism includes a damping force generating valve urged in a valve closing direction by pressure in a pilot chamber, and a control valve discharging pressure from the pilot chamber into a downstream one of the two chambers in the cylinder. The control valve has a shaft portion provided therein with a communicating passage extending in an axial direction, a movable element provided around the periphery of the shaft portion, a solenoid driving the movable element in the axial direction, a valving element provided at one end of the shaft portion, and a valve seat on which the valving element seats. The communicating passage in the shaft portion is communicated at one end thereof with the pilot chamber and at the other end thereof with an upstream one of the two chambers in the cylinder through an orifice. The other end of the communicating passage may be communicated directly with the upstream one of the two chambers in the cylinder through an orifice.

A damping force control type shock absorber according to one embodiment of the present invention includes a cylinder having a hydraulic fluid sealed therein, a piston slidably fitted in the cylinder to divide the interior of the cylinder into two chambers, a piston rod connected at one end thereof to the piston and extended at the other end thereof to the outside of the cylinder, and a damping valve mechanism provided in the cylinder to generate damping force by controlling a flow of hydraulic fluid between the two chambers in the cylinder that is caused by movement of the piston rod. The damping valve mechanism includes a damping force generating valve urged in a valve closing direction by pressure in a pilot chamber, and a control valve discharging pressure from the pilot chamber into a downstream one of the two chambers in the cylinder. Further, the damping valve mechanism has a passage communicating between the two chambers in the cylinder. The passage is provided with an orifice communicating with an upstream one of the two chambers in the cylinder, a back-pressure chamber communicating with the passage through the orifice, and the above-described control valve controlling the flow of hydraulic fluid flowing from the upstream chamber to the downstream chamber through the orifice.

The damping force control type shock absorber according to one embodiment of the present invention is capable of achieving both air bleeding performance and damping force responsiveness at reduced cost.

DESCRIPTION OF EMBODIMENTS

First Embodiment

A first embodiment of the present invention will be explained with reference to the accompanying drawings. It should be noted that in the following explanation the vertical direction in FIG. 1 will be referred to as the "vertical direction" as it is.

Figure 1:
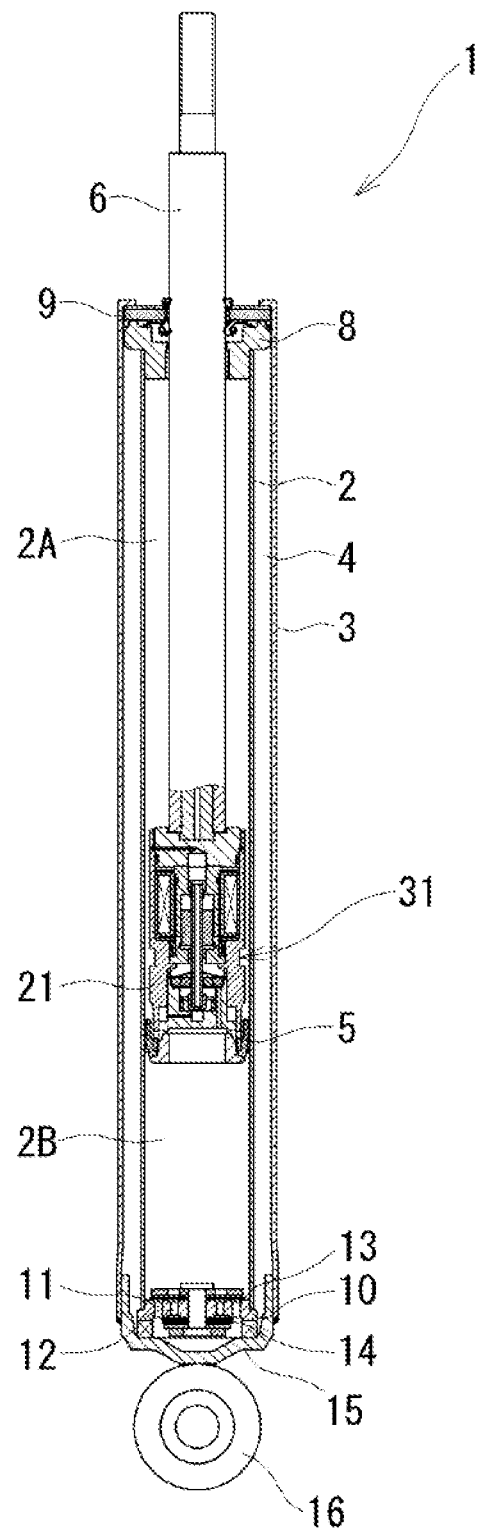
FIG. 1 is a sectional view taken along a uniaxial plane of a shock absorber according to a first embodiment.

As shown in FIG. 1, a damping force control type shock absorber 1 according to the first embodiment has a dual-tube structure comprising a cylinder 2 and an outer tube 3 provided outside the cylinder 2. A reservoir 4 is formed between the cylinder 2 and the outer tube 3. The cylinder 2 has a piston valve 5 (piston) slidably fitted therein. The piston valve 5 divides the interior of the cylinder 2 into two chambers, i.e. a cylinder upper chamber 2A and a cylinder lower chamber 2B.

Figure 2:
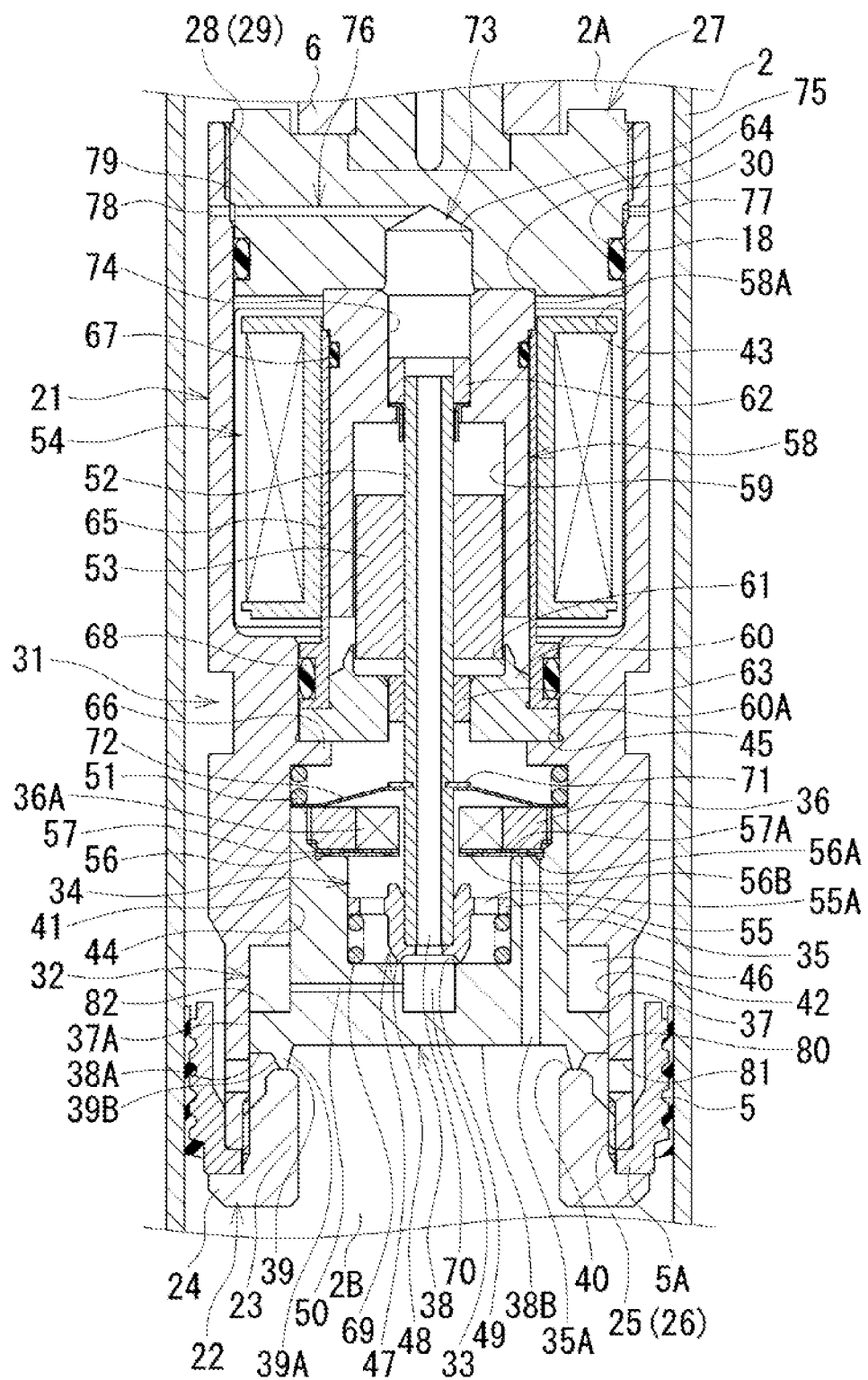
FIG. 2 is an enlarged view of an important part of FIG. 1.

As shown in FIG. 2, the piston valve 5 is provided at a lower end of a substantially cylindrical piston casing 21. The piston casing 21 is provided at the lower end thereof with a valve seat member 22 with respect to which a main valve 35 (described later) selectively seats and unseats. The valve seat member 22 has a cylindrical shaft portion 23, a flange portion 24 formed at the lower end of the shaft portion 23, and a threaded portion 25 formed on the outer peripheral surface of the shaft portion 23. The valve seat member 22 is secured to the piston casing 21 by threadedly engaging the threaded portion 25 with a threaded portion 26 formed in a first axial hole 42 in the piston casing 21. Thus, an inward flange portion 5A of the piston valve 5 is clamped between the lower end face of the piston casing 21 and the flange portion 24 of the valve seat member 22, and the piston valve 5 is secured to the lower end of the piston casing 21.

As shown in FIG. 1, the cylinder 2 is provided at the lower end thereof with a base valve 10 dividing the cylinder lower chamber 2B and the reservoir 4 from each other. The base valve 10 is provided with passages 11 and 12 communicating between the cylinder lower chamber 2B and the reservoir 4. The passage 11 is provided with a cheek valve 13 allowing only a flow of hydraulic oil from the reservoir 4 toward the cylinder lower chamber 2B. On the other hand, the passage 12 is provided with a disk valve 14 that opens when the hydraulic oil pressure in the cylinder lower chamber 2B reaches a predetermined pressure to relieve the pressure in the cylinder lower chamber 2B to the reservoir 4. It should be noted that as hydraulic fluid, hydraulic oil is sealed in the cylinder 2, and the hydraulic oil and gas are sealed in the reservoir 4. Further, in FIG. 1, reference sign 15 denotes a bottom cap joined to the lower end of the outer tube 3, and reference sign 16 denotes a mounting eye 16 joined to the bottom cap 15.

As shown in FIG. 2, the upper end of the piston casing 21 is closed with a substantially circular columnar coil cap 27. The coil cap 27 has a threaded portion 28 formed on the outer peripheral surface of the upper end thereof. The coil cap 27 is secured to the piston casing 21 by threadedly engaging the threaded portion 28 with a threaded portion 29 formed on the upper end of a second axial hole 43 in the piston casing 21. Further, the coil cap 27 has an annular seal groove 30 formed along the outer peripheral surface of the lower end thereof. An O-ring 18 is fitted in the seal groove 30 to seal between the coil cap 27 and the second axial hole 43 in the piston casing 21. It should be noted that one end of a piston rod 6 is connected to the center of the upper end of the coil cap 27. The other end of the piston rod 6 extends through the cylinder upper chamber 2A and through a rod guide 8 and an oil seal 9 (see FIG. 1), which are fitted to the upper end of the dual-tube structure comprising the cylinder 2 and the outer tube 3, and extends to the outside of the cylinder 2.

(Damping Valve Mechanism)

The piston casing 21, and hence the cylinder 2, is provided therein with a damping valve mechanism 31 generating damping force by controlling a flow of hydraulic oil (hydraulic fluid) between the two chambers, i.e. the cylinder upper chamber 2A and the cylinder lower chamber 2B, which is caused or induced by movement (extension and contraction) of the piston rod 6. The damping valve mechanism 31 has a damping force generating valve 32 urged in a valve closing direction (downward direction in FIG. 2) by pressure in a pilot chamber 33 (described later), and a control valve 34 discharging (relieving) the hydraulic oil (pressure) from the pilot chamber 33 into the cylinder lower chamber 2B (downstream chamber) during the extension stroke of the piston rod 6. It should be noted that, when the damping valve mechanism 31 opens against the pressure in the pilot chamber 33, the hydraulic oil is discharged from one chamber into the other chamber, and that the term the "downstream chamber" as used in the invention of this application means the other chamber.

The damping force generating valve 32 has a main valve 35 accommodated in a lower part of the piston casing 21. The main valve 35 is formed substantially in a bottomed cylindrical shape and has a retaining plate 36 fitted in an upper end opening thereof, the retaining plate 36 having an axial hole. The main valve 35 has a flange portion 37 (outward flange) formed at the lower end thereof. Further, the main valve 35 has an annular seat portion 39 formed on a lower end face 38 thereof. The seat portion 39 is provided coaxially with the piston rod 6 to selectively seat on and unseat from a valve seat 40 of the valve seat member 22.

It should be noted that a height difference (a difference in level) is provided between an annular surface 38A outward of the seat portion 39 (surface 38A closer to the flange portion 37) and a surface 38B inward of the seat portion 39 to provide the surface 38B, which is inward of the seat portion 39, at a higher position than the annular surface 38A, thereby securing an area for an inner peripheral surface 39A (pressure-receiving surface) of the seat portion 39. Further, when the seat portion 39 of the main valve 35 seats on the valve seat 40 of the valve seat member 22, an annular chamber 80 is formed between the lower end portion of the piston casing 21, the valve seat member 22, and the main valve 35. In addition, the lower end portion of the piston casing 21 is provided with a plurality of passages 81 communicating between the annular chamber 80 and the cylinder upper chamber 2A.

The main valve 35 is slidably fitted at an outer peripheral surface 41 thereof into a third axial hole 44 in the piston casing 21, and the flange portion 37 is slidably fitted at an outer peripheral surface 37A thereof into the first axial hole 42 in the piston casing 21. Consequently, an annular back-pressure chamber 46 is formed between the main valve 35 and the first axial hole 42. Further, the main valve 35 is provided on the bottom thereof with a valve seat 49 with respect to which an annular seat portion 48 of a pilot valve 47 (valving element, described later) selectively seats and unseats. The valve seat 49 of the main valve 35 is provided with a pilot chamber 33 whose opening is surrounded by the seat portion 48 of the pilot valve 47 when seated. The pilot chamber 33 is communicated with the back-pressure chamber 46 through a communicating passage 50.

It should be noted that reference sign 51 in FIG. 2 denotes a compression coil spring applying a set load to the main valve 35. The main valve 35 is urged downward relative to the piston casing 21, i.e. in the valve closing direction, by the spring force of the compression coil spring 51. Further, the main valve 35 has disk valves 56 and 57 secured thereto, which are held at their outer peripheral edges by the retaining plate 36.

The above-described control valve 34 includes a pilot valve 47, an actuating pin 52 (shaft portion) having the pilot valve 47 secured to the lower end (one end) thereof, a plunger 53 (movable element) secured to the outer periphery of the actuating pin 52, and a solenoid 54 driving the plunger 53 in the vertical direction (axial direction). The pilot valve 47 is an on-off valve whose valve opening pressure is controlled in accordance with energization of the solenoid 54. The pilot valve 47 has a flange portion 55 formed on the outer periphery thereof over the entire circumference. The flange portion 55 functions as a spring retainer. Further, the pilot valve 47 has a plurality of passages 55A vertically extending through the flange portion 55. Iii addition, the pilot valve 47 is formed with an axial hole that constitutes a communicating passage 70 together with the axial hole in the actuating pin 52.

In the first embodiment, when the solenoid 54 is not energized, i.e. when the pilot valve 47 is most separated from the valve seat 49 of the main valve 35 by the spring force of a fail-safe spring 69 (compression coil spring), the pilot valve 47 abuts against the disk valve 56. In this way, a fail-safe valve is constructed.

The solenoid 54 has a easing member 58 formed with a plunger bore 59, and a core 60 formed with a recess 61 that is slidably fitted with a lower end portion of the plunger 53. The casing member 58 is formed substantially in a cylindrical shape and has a flange portion 58A formed around the outer periphery of an upper end portion thereof. Further, the casing member 58 is fitted at the upper end portion thereof into a recess 64 formed in the lower end face of the coil cap 27. In addition, the casing member 58 has a sleeve 65 fitted around the outer peripheral surface thereof. The lower end portion of the sleeve 65 is fitted into a fourth axial hole 45 in the piston casing 21. Thus, the casing member 58 is positioned coaxially with the center line of the piston casing 21.

On the other hand, the core 60 is formed substantially in a cylindrical shape and has a flange portion 60A formed around the outer periphery of a lower end portion thereof. The flange portion 60A is fitted into the fourth axial hole 45 in the piston casing 21, and the flange portion 60A is abutted against an annular projection 66 formed between the third and fourth axial holes 44 and 45 in the piston casing 21, thereby allowing the core 60 to be vertically positioned with respect to the piston casing 21. It should be noted that the inner peripheral surface of a lower end portion of the sleeve 65 is fitted to the outer peripheral surface of the core 60. Further, the sleeve 65 is abutted at the lower end thereof against the flange portion 60A of the core 60, thereby allowing the sleeve 65 to be vertically positioned with respect to the piston casing 21. Reference sign 67 in FIG. 2 denotes an O-ring sealing between the casing member 58 and the sleeve 65, and reference sign 68 in FIG. 2 denotes an O-ring sealing between the sleeve 65 and the fourth axial hole 45 in the piston casing 21.

Meanwhile, the actuating pin 52 is vertically movably supported by a pair of bushes 62 and 63 assembled into the casing member 58 and the core 60, respectively. The actuating pin 52 has an axial hole constituting the above-described communicating passage 70 together with the axial hole in the pilot valve 47. The communicating passage 70 is communicated at the lower end (one end) thereof with the pilot chamber 33 and at the upper end (the other end) thereof with the cylinder upper chamber 2A (the upstream chamber during the extension stroke of the piston rod 6) through a passage 73. The passage 73 includes an axial hole 74 in the casing member 58, a blind hole 75 of a predetermined depth formed in the center of the lower end face of the coil cap 27, and an orifice 76 communicating between the blind hole 75 and the cylinder upper chamber 2A. In other words, the communicating passage 70 is communicated at one end thereof with the pilot chamber 33 and at the other end thereof with the upstream one of the two chambers in the cylinder 2, i.e. the cylinder upper chamber 2A during the extension stroke, directly through the orifice 76. It should be noted that it is desirable that the communicating passage 70 be communicated directly with the upstream one of the two chambers in the cylinder 2 through the orifice 76 because, by so doing, the pressure in the pilot chamber 33 becomes a desired pressure. However, the present invention does not exclude a structure in which the communicating passage 70 is not directly communicated with the upstream one of the two chambers in the cylinder 2.

The orifice 76 comprises an annular passage 77 formed between the upper end portion of the piston easing 21 and the coil cap 27, a first orifice 78 provided in the upper end portion of the piston casing 21 to communicate between the cylinder upper chamber 2A and the annular passage 77, and a second orifice 79 provided in the coil cap 27 to communicate between the blind hole 75 and the annular passage 77. It should be noted that the axial hole 74 in the casing member 58 and the blind hole 75 in the coil cap 27 form in combination a valving element back-pressure chamber of the pilot valve 47.

Further, the actuating pin 52 has a retaining ring 71 fitted in an annular groove formed in the outer peripheral surface thereof. The retaining ring 71 is engaged with an upper end of a pilot spring 72 clamped at a lower end thereof between the main valve 35 and the compression coil spring 51. Thus, the actuating pin 52 is urged upward by the spring force of the pilot spring 72. When the control electric current supplied to the solenoid 54 is a low electric current, the spring force of the pilot spring 72 exceeds the solenoid thrust, and the seat portion 48 of the control valve 34 unseats from the valve seat 49 of the main valve 35. Thus, the control valve 34 opens.

(Operation)

Next, the operation of the first embodiment will be explained.

The damping force control type shock absorber 1 is installed between sprung and unsprung members of a suspension system of a vehicle. During running of the vehicle, when vertical vibrations are caused by unevenness on the road surface, the piston rod 6 is displaced to extend from and withdraw into the outer tube 3 so as to generate damping force in the damping valve mechanism 31. Thus, the shock absorber 1 absorbs the vibrations of the vehicle. At this time, the damping valve mechanism 31 operates as follows. During the extension stroke of the piston rod 6, the damping valve mechanism 31 variably adjusts the damping force by varying the back pressure acting on the main valve 35. During the compression stroke of the piston rod 6, on the other hand, the damping valve mechanism 31 variably adjusts the damping force by varying the valve opening pressure of the pilot valve 47 through adjustment of the thrust (control electric current) of the solenoid 54.

During the extension stroke of the piston rod 6, the hydraulic oil (hydraulic fluid) in the cylinder upper chamber 2A is pressurized by the movement of the piston valve 5 (piston) in the cylinder 2. The pressure of hydraulic oil in the cylinder upper chamber 2A acts on the back-pressure chamber 46 through the passage 73, which includes the orifice 76, the communicating passage 70, the pilot chamber 33, and the communicating passage 50. At this time, the pressure-receiving area (S1) of the main valve 35 is an area obtained by subtracting the area of a cross-section of the back-pressure chamber 46 taken along a plane perpendicular to the axis, i.e. the area (S4) of the annular upper end face 82 of the flange portion 37, from the sum (S2+S3) of the area (S2) of the annular surface 38A of the main valve 35 and the area (S3) of the outer peripheral surface 3913 of the annular seat portion 39 (i.e. S1=S2+S3−S4).

When the pilot valve 47 opens, i.e. when the seat portion 48 of the pilot valve 47 unseats from the valve seat 49 of the main valve 35, the hydraulic oil in the pilot chamber 33 (back-pressure chamber 46) is discharged into the cylinder lower chamber 2B through the passages 55A in the flange portion 55 of the pilot valve 47, a cut portion 36A formed in the retaining plate 36, a cut portion 57A formed in the disk valve 57, a cut portion 56A formed in the outer peripheral edge of the disk valve 56, and a vertically extending passage 35A formed in the main valve 35.

At this time, an amount of hydraulic oil corresponding to an amount by which the piston rod 6 withdraws from the cylinder 2 flows out of the reservoir 4 and opens the check valve 13 of the base valve 10 to enter the cylinder lower chamber 2B. It should be noted that the pressure-receiving area of the pilot valve 47 is an area obtained by subtracting the area of a cross-section of the actuating pin 52 (shaft portion) taken along a plane perpendicular to the axis (i.e. the arear of the valve element back–pressure chamber side) from the area of the lower surface of the pilot valve 47 inward of the seat portion 48 (i.e. the area of the surface of the pilot valve 47 on a side thereof closer to the valve seat).

During the compression stroke of the piston rod 6, when the control electric current supplied to the solenoid 54 is a low electric current, the force with which the pilot spring 72 pushes up the actuating pin 52 exceeds the thrust of the solenoid 54. Consequently, the seat portion 48 of the pilot valve 47 unseats from the valve seat 49 of the main valve 35, and thus the pilot valve 47 (control valve 34) opens. As a result, the hydraulic oil in the cylinder lower chamber 2B flows into the cylinder upper chamber 2A through the passage 35A in the main valve 35, the cut portion 56A in the disk valve 56, the cut portion 57A in the disk valve 57, the cut portion 36A in the retaining plate 36, the passages 55A in the flange portion 55 of the pilot valve 47, the communicating passage 70, and the passage 73, which includes the orifice 76.

On the other hand, when the solenoid thrust exceeds the push-up force of the pilot spring 72 during the compression stroke of the piston rod 6, the seat portion 48 of the pilot valve 47 seats on the valve seat 49 of the main valve 35, and thus the pilot valve 47 (control valve 34) closes. At this time, the valve opening pressure of the main valve 35 (damping force generating valve 32) depends on the thrust of the plunger 53 (movable element), which is generated by the solenoid 54. The pressure-receiving area of the main valve 35 at this time is an area obtained by subtracting the cross-sectional area of the third axial hole 44 in the piston casing 21 from the area inward of the seat portion 39.

It should be noted that an amount of hydraulic oil corresponding to an amount by which the piston rod 6 enters the cylinder 2 flows into the reservoir 4 when the pressure in the cylinder lower chamber 2B reaches the valve opening pressure of the disk valve 14 of the base valve 10 and consequently the disk valve 14 opens.

In the event that the thrust of the plunger 53, and hence the thrust of the actuating pin 52, is lost owing to a failure such as disconnection of the coil of the solenoid 54, a trouble in the in-vehicle controller, etc., the pilot valve 47 is retracted by the spring force of the fail-safe spring 69. Thus, the pilot chamber 33 is opened, and the annular upper end of the pilot valve 47 is abutted against the disk valve 56. In this state, the cylinder upper chamber 2A and the cylinder lower chamber 2B are communicated with each other through the passage 73, which includes the orifice 76, the communicating passage 70, the passages 55A in the flange portion 55 of the pilot valve 47, a cut portion 56B of the disk valve 56, the cut portion 57A of the disk valve 57, the cut portion 56A of the disk valve 56, and the passage 35A in the main valve 35. Thus, damping force of orifice characteristics can be obtained even when there is a failure.

(Advantages)

According to the first embodiment, when the pilot valve 47 is closed during the extension stroke of the piston rod 6, the cylinder upper chamber 2A is communicated with the back-pressure chamber 46 of the main valve 35 through the passage 73, which includes the orifice 76, the communicating passage 70, which includes the axial hole in the actuating pin 52 (shaft portion), the pilot chamber 33, which is formed in the main valve 35, and the communicating passage 50.

In this state, the cylinder upper chamber 2A is not communicated with the cylinder lower chamber 2B. That is, because the pressure in the cylinder upper chamber 2A is higher than the pressure in the cylinder lower chamber 2B, the hydraulic oil cannot flow from the cylinder upper chamber 2A into the cylinder lower chamber 2B. Therefore, it is possible to prevent delay in rising of damping force. Further, because the pressure in the cylinder upper chamber 2A cannot escape into the cylinder lower chamber 2B, it is possible to solve drawbacks such as the limitation on the damping force adjustable range.

In a conventional structure in which the cylinder upper chamber 2A and the cylinder lower chamber 2B are constantly communicated with each other, a check valve is provided in the passage, or the cross-sectional area (flow path area) of the passage is set small. Consequently, the structure becomes complicated, and tolerances become tighter, which unavoidably leads to an increase in manufacturing cost. The first embodiment can solve these drawbacks associated with the conventional technique.

Further, in the first embodiment, even if air enters the pilot chamber 33 during assembly of the damping force control type shock absorber 1, the air moves upward through the communicating passage 70 and is smoothly discharged into the cylinder upper chamber 2A through the passage 73. In other words, the pilot valve 47 can perform the function of the check valve shown in the prior art document.

It should be noted that air bleeding of the control valve 34 can be performed during the compression stroke of the piston rod 6, i.e. when the pressure in the cylinder upper chamber 2A is lower than the pressure in the cylinder lower chamber 2B.

Second Embodiment

A second embodiment of the present invention will be explained with reference to the accompanying drawings. It should be noted that the same or equivalent constituent elements as those of the damping force control type shock absorber 1 according to the foregoing first embodiment will be given the same names and signs as those in the first embodiment, and that a detailed description thereof will be omitted.

Figure 3:
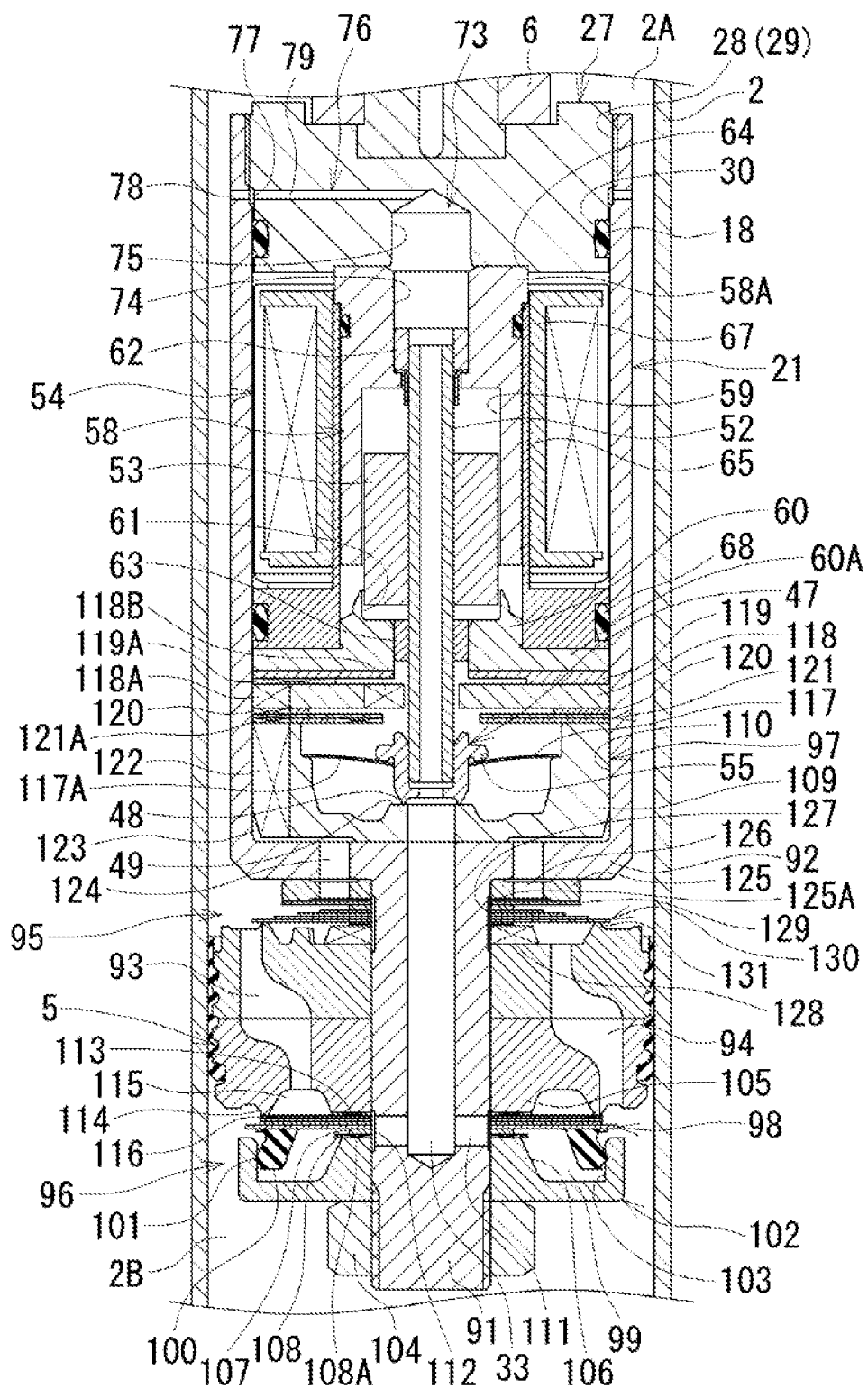
FIG. 3 is an explanatory view of a second embodiment, which corresponds to FIG. 2 of the first embodiment.

As shown in FIG. 3, a piston 5 is fitted onto a shaft portion 91 of a piston casing 21. The shaft portion 91 of the piston casing 21 is provided coaxially with a piston rod 6 and extends downward from a bottom portion 92 of the piston casing 21. It should be noted that the piston 5 is provided with an extension passage 93 opening at one end (upper end) thereof into a cylinder upper chamber 2A and a compression passage 94 opening at one end (lower end) thereof into a cylinder lower chamber 2B.

(Damping Valve Mechanism)

A cylinder 2 is provided therein with a damping valve mechanism 95 generating damping force by controlling a flow of hydraulic oil (hydraulic fluid) between two chambers, i.e. a cylinder upper chamber 2A and a cylinder lower chamber 2B, which is caused or induced by movement (extension and contraction) of the piston rod 6. The damping valve mechanism 95 comprises a damping force generating valve 96 urged in a valve closing direction (upward direction in FIG. 3) by the pressure in a pilot chamber 33, and a control valve 97 controlling the flow of hydraulic oil (hydraulic fluid) flowing from the cylinder upper chamber 2A (upstream chamber) to the cylinder lower chamber 2B (downstream chamber) through an orifice 76 during the extension stroke of the piston rod 6.

The damping force generating valve 96 has a main valve 98 (disk valve) provided at the lower end of the piston 5 and a back-pressure chamber 99 configured such that the pressure in the back-pressure chamber 99 acts on the main valve 98 in a valve closing direction. The back-pressure chamber 99 is an annular space centered on the shaft portion 91. The back-pressure chamber 99 is formed by slidably abutting a seat portion 101 of an annular packing 100, which is provided on an outer peripheral portion of the lower surface of the main valve 98, against an annular recess 103 of a pilot casing 102. The pilot casing 102 is secured to the piston casing 21 by a nut 104 threadedly engaged with the distal end portion of the shaft portion 91. The inner peripheral portion of the main valve 98 is clamped by an inner peripheral portion 105 of the piston 5 and an inner peripheral portion 106 of the pilot casing 102. It should be noted that between the inner peripheral portion of the main valve 98 and the inner peripheral portion 106 of the pilot casing 102, a spacer 107 and a passage member 108 are provided from top to bottom.

The control valve 97 has a pilot body 109 accommodated in a bottom portion of the piston casing 21. The pilot body 109 is formed substantially in the shape of a bottomed cylinder having an axial hole in the bottom thereof. The pilot body 109 is fitted at the outer peripheral surface thereof to an inner peripheral surface 110 of the piston casing 21. Further, the pilot body 109 has a valve seat 49 provided around the axial hole in the center of the bottom thereof such that the pilot valve 47 selectively seats on and unseats from the valve seat 49. The axial hole in the pilot body 109 forms a pilot chamber 33 together with an axial hole (blind hole) vertically extending inside the shaft portion 91 of the piston casing 21.

When the control valve 97 is closed, i.e. when the seat portion 48 of the pilot valve 47 seats on the valve seat 49 of the pilot body 109, the cylinder upper chamber 2A is communicated with the back-pressure chamber 99 through a passage 73 including the orifice 76, the pilot chamber 33, a passage 111 formed in the shaft portion 91 of the piston casing 21 to extend radially (horizontally in FIG. 3), an annular passage 112 provided on the outer periphery of the shaft portion 91, and a cut portion 108A of the passage member 108. Consequently, during the extension stroke of the piston rod 6, the hydraulic oil (hydraulic fluid) in the cylinder upper chamber 2A can be introduced into the back-pressure chamber 99.

During the extension stroke of the piston rod 6, before the main valve 98 (damping force generating valve 96) opens, the hydraulic oil in the cylinder upper chamber 2A flows into the cylinder lower chamber 2B through the passage 73, which includes the orifice 76, the pilot chamber 33, the passage 111, the annular passage 112, a passage 113 provided at the lower end of the inner peripheral portion 105 of the piston 5, an annular passage 115 formed at the lower end of the piston 5 between the inner peripheral portion 105, an annular seat portion 114, and the main valve 98, and a cut portion 116 of the main valve 98. In parallel to this hydraulic oil flow, the hydraulic oil in the cylinder upper chamber 2A flows into the cylinder lower chamber 2B through the extension passage 93, the annular passage 115, and the cut portion 116 of the main valve 98. Thus, damping force of orifice characteristics can be obtained before the main valve 98 opens. The damping force can be variably adjusted by varying the back pressure acting on the main valve 35 through adjustment of the thrust (control electric current) of the solenoid 54.

On the other hand, when the control valve 97 opens, i.e. when the pilot valve 47 moves upward against the thrust of the solenoid 54 and consequently the seat portion 49 of the pilot valve 47 unseats from the valve seat 49 of the pilot body 109, the hydraulic oil in the pilot chamber 33 is discharged into the cylinder lower chamber 2B.

That is, the hydraulic oil in the pilot chamber 33 flows into the cylinder lower chamber 2B via a cut portion 117A formed in a fail-safe spring 117, a cut portion 118B formed in a circular plate 118, a passage 119A formed in a spacer 119, a cut portion 118A formed in the plate 118, a cut portion 120A formed in a spacer 120, a cut portion 121A formed in a disk valve 121, a cut portion 122 formed in the pilot body 109, an annular passage 123 formed between the piston casing 21 and the pilot body 109, a passage 124 formed in the bottom portion 92 of the piston casing 21, a cut portion 125A formed in a valve seat member 125, an annular passage 127 provided around the outer periphery of the shaft portion 91 of the piston casing 21, a cut portion 128 provided at the upper end of the inner peripheral portion 105 of the piston 5, and the compression passage 94.

When a failure occurs, i.e. when the thrust of the plunger 53, and hence the thrust of the actuating pin 52, is lost, the pilot valve 47 is retracted by the spring force of the fail-safe spring 117. Thus, the pilot chamber 33 opens, and the annular upper end of the pilot valve 47 abuts against the periphery of an axial hole in the plate 118. At the same time, the flange portion 55 of the pilot valve 47 abuts against the disk valve 121.

In this state, the cylinder upper chamber 2A and the cylinder lower chamber 2B are communicated with each other through the passage 73, which includes the orifice 76, the communicating passage 70, a cut portion 121B formed in the disk valve 121, the cut portion 118B formed in the plate, the passage 119A formed in the spacer 119, the cut portion 118A formed in the plate 118, the cut portion 120A formed in the spacer 120, the cut portion 121A formed in the disk valve 121, the cut portion 122 formed in the pilot body 109, the annular passage 123 formed between the piston casing 21 and the pilot body 109, a passage 124 formed in the bottom portion 92 of the piston casing 21, the cut portion 125A formed in the valve seat member 125, the annular passage 127 provided around the outer periphery of the shaft portion 91 of the piston easing 21, the cut portion 128 provided at the upper end of the inner peripheral portion 105 of the piston 5, and the compression passage 94. Thus, damping force of orifice and valve characteristics can be obtained even when there is a failure.

It should be noted that, during the compression stroke of the piston rod 6, damping force of valve characteristics can be obtained by a disk valve 130. That is, damping force of valve characteristics is generated when the disk valve 130 opens, unseating from an annular seat portion 131 formed on the upper end face of the piston 5.

(Advantages)

According to the second embodiment, when the pilot valve 47 is closed during the extension stroke of the piston rod 6, the cylinder upper chamber 2A is communicated with the back-pressure chamber 99 through the passage 73, which includes the orifice 76, the communicating passage 70, the pilot chamber 33, the passage 111, the annular passage 112, and the cut portion 108A.

In this state, the cylinder upper chamber 2A is not communicated with the cylinder lower chamber 2B. That is, because the pressure in the cylinder upper chamber 2A is higher than the pressure in the cylinder lower chamber 2B, the hydraulic oil cannot flow from the cylinder upper chamber 2A into the cylinder lower chamber 2B. Therefore, it is possible to prevent delay in rising of damping force. Further, because the pressure in the cylinder upper chamber 2A cannot escape into the cylinder lower chamber 2B, it is possible to solve drawbacks such as the limitation on the damping force adjustable range.

In a conventional structure in which the cylinder upper chamber 2A and the cylinder lower chamber 2B are constantly communicated with each other, a check valve is provided in the passage, or the cross-sectional area (flow path area) of the passage is set small. Consequently, the structure becomes complicated, and tolerances become tighter, which unavoidably leads to an increase in manufacturing cost. The second embodiment can solve these drawbacks associated with the conventional technique.

Further, air entering the pilot chamber 33 moves upward through the communicating passage 70. Therefore, the air can be smoothly discharged into the cylinder upper chamber 2A through the passage 73.

It should be noted that air bleeding of the control valve 97 can be performed during the compression stroke of the piston rod 6, i.e. when the pressure in the cylinder upper chamber 2A is lower than the pressure in the cylinder lower chamber 2B. Conversely, during the extension stroke of the piston rod 6, i.e. when the pressure in the cylinder upper chamber 2A is higher than the pressure in the cylinder lower chamber 2B, air bleeding of the control valve 97 cannot be performed.

Although only some exemplary embodiments of the present invention have been described above, those skilled in the art will readily appreciate that various changes or improvements can be made to the exemplary embodiments without materially departing from the novel teaching and advantages of the present invention. Accordingly, all such changes or improvements are intended to be included within the technical scope of the present invention. The foregoing embodiments may be combined at will.

The present application claims priority to Japanese Patent Application. No. 2015-230748 filed on Nov. 26, 2015. The entire disclosure of Japanese Patent Application No. 2015-230748 filed on Nov. 26, 2015 including specification, claims, drawings and summary is incorporated herein by reference in its entirety.

REFERENCE SIGNS LIST

1: shock absorber; 2: cylinder; 2A: cylinder upper chamber; 2B: cylinder lower chamber; 5: piston; 6: piston rod; 31: damping valve mechanism; 32: damping force generating valve; 33: pilot chamber; 34: control valve (valving element); 49: valve seat; 52: actuating pin (shaft portion); 53: plunger (movable element); 54: solenoid; 70: communicating passage; 76: orifice.

The invention claimed is:

1. A damping force control type shock absorber comprising:
   a cylinder having a hydraulic fluid sealed therein;
   a piston slidably fitted in the cylinder to divide an interior of the cylinder into two chambers;
   a piston rod connected at one end thereof to the piston and extended at an other end thereof to an outside of the cylinder; and
   a damping valve mechanism provided in the cylinder to generate damping force by controlling a flow of hydraulic fluid between the two chambers in the cylinder that is caused by movement of the piston rod;
   the damping valve mechanism including
   a damping force generating valve that is urged in a valve closing direction by pressure in a pilot chamber, and
   a control valve that discharges pressure from the pilot chamber into a downstream one of the two chambers in the cylinder;
   the control valve including
   a shaft portion provided therein with a communicating passage extending in an axial direction,
   a movable element provided around a periphery of the shaft portion,
   a solenoid that drives the movable element in the axial direction,
   a valving element provided at one end of the shaft portion, and
   a valve seat on which the valving element seats;
   the communicating passage in the shaft portion being communicated at one end thereof with the pilot chamber and at an other end thereof with an upstream one of the two chambers in the cylinder.

2. The damping force control type shock absorber of claim 1, wherein the other end of the communicating passage is communicated directly with the upstream one of the two chambers in the cylinder.

3. The damping force control type shock absorber of claim 1, wherein a valving element back-pressure chamber is provided at the other end of the communicating passage in the shaft portion,
   the valving element back-pressure chamber being configured such that pressure in the valving element back-pressure chamber acts on the valving element in a direction in which the valving element is urged toward the valve seat, and
   when the pilot chamber and the valving element back-pressure chamber are communicated with each other through the communicating passage in the shaft portion in a state where the valving element is seated on the valve seat, a pressure-receiving area of the valving element is an area obtained by subtracting an area of the valving element back-pressure chamber from an area of a surface of the valving element on a side thereof closer to the valve seat.

4. A damping force control type shock absorber comprising:
   a cylinder having a hydraulic fluid sealed therein;
   a piston slidably fitted in the cylinder to divide an interior of the cylinder into two chambers;
   a piston rod connected at one end thereof to the piston and extended at an other end thereof to an outside of the cylinder; and a damping valve mechanism provided in the cylinder to generate damping force by controlling a flow of hydraulic fluid between the two chambers in the cylinder that is caused by movement of the piston rod;
the damping valve mechanism including
a damping force generating valve that is urged in a valve closing direction by pressure in a pilot chamber, and
a control valve that discharges pressure from the pilot chamber into a downstream one of the two chambers in the cylinder;
the damping valve mechanism including a passage communicating between the two chambers in the cylinder;
the passage being provided with
an orifice communicating with an upstream one of the two chambers in the cylinder,
a back-pressure chamber communicating with the passage through the orifice, and
the control valve that controls a flow of hydraulic fluid flowing from the upstream chamber to the downstream chamber through the orifice.

* * * * *